(12) United States Patent
Gao et al.

(10) Patent No.: US 8,520,728 B2
(45) Date of Patent: Aug. 27, 2013

(54) ADAPTIVE DATA TRANSMISSION RATE CONTROL FOR A WIRELESS DISPLAY DEVICE

(75) Inventors: Jie Gao, Sunnyvale, CA (US); Xintian E. Lin, Palo Alto, CA (US); Inching Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 12/924,231

(22) Filed: Sep. 23, 2010

(65) Prior Publication Data
US 2012/0076199 A1    Mar. 29, 2012

(51) Int. Cl.
*H04N 7/12* (2006.01)
*H04N 11/02* (2006.01)
*H04N 11/04* (2006.01)

(52) U.S. Cl.
USPC .................................................... 375/240.02

(58) Field of Classification Search
USPC ........................................................ 375/240
See application file for complete search history.

(56) References Cited

U.S. PATENT DOCUMENTS

| 7,477,688 B1 * | 1/2009 | Zhang et al. ................... 375/240 |
| 8,184,720 B2 * | 5/2012 | Onur et al. ................ 375/240.26 |
| 2008/0192815 A1 * | 8/2008 | Yun et al. ....................... 375/225 |
| 2009/0196343 A1 * | 8/2009 | Cho et al. ................. 375/240.02 |
| 2010/0189063 A1 * | 7/2010 | Kokku et al. .................. 370/329 |
| 2011/0122786 A1 * | 5/2011 | Koo et al. ...................... 370/252 |
| 2012/0147946 A1 * | 6/2012 | Gao et al. ................. 375/240.02 |

* cited by examiner

*Primary Examiner* — Joseph Ustaris
*Assistant Examiner* — Talha Nawaz
(74) *Attorney, Agent, or Firm* — Schwegman, Lundberg & Woessner, P.A.

(57) ABSTRACT

A method, a computer readable medium and an apparatus to adaptively control a data transmission rate of a wireless display device. The method includes determining a current data transmission rate capacity of a wireless channel; and controlling a data transmission rate of a wireless transmission device based on the current data transmission rate capacity.

17 Claims, 2 Drawing Sheets

ADAPTIVE DATA TRANSMISSION RATE CONTROL FOR A WIRELESS DISPLAY DEVICE

FIELD

Some embodiments pertain to wireless communications. Some embodiments pertain to a video data compression for a wireless display device.

BACKGROUND

Wireless capability allows a variety of devices to communicate with each other adding to the mobility of users. A computing device, such as a Personal Computer (PC), may be used with various peripherals which are not wired together, but rather communicate using wireless communications, such as Wireless Local Area Network (WLAN) type protocols. As operations are performed by the PC, changes to information for display are sent to a wireless display device. Wireless display is a technology in which image information, such as video information, on a computer display/screen is firstly captured and encoded, and is then wirelessly transmitted to an adaptor, for example through WiFi. The video data is then decoded and displayed on another screen, such as a screen on a high definition television HDTV. Since the encoded video data is transmitted over a wireless channel, the video quality is highly dependent on channel conditions, which condition may detrimentally change to adversely affect video quality on the display screen

SUMMARY

A method performed to control a transmit rate of a wireless display device comprises determining a current data transmission rate capacity of a wireless channel, and controlling a data transmission rate of a wireless transmission device based on the current data transmission rate capacity.

DETAILED DESCRIPTION

Figure 1:
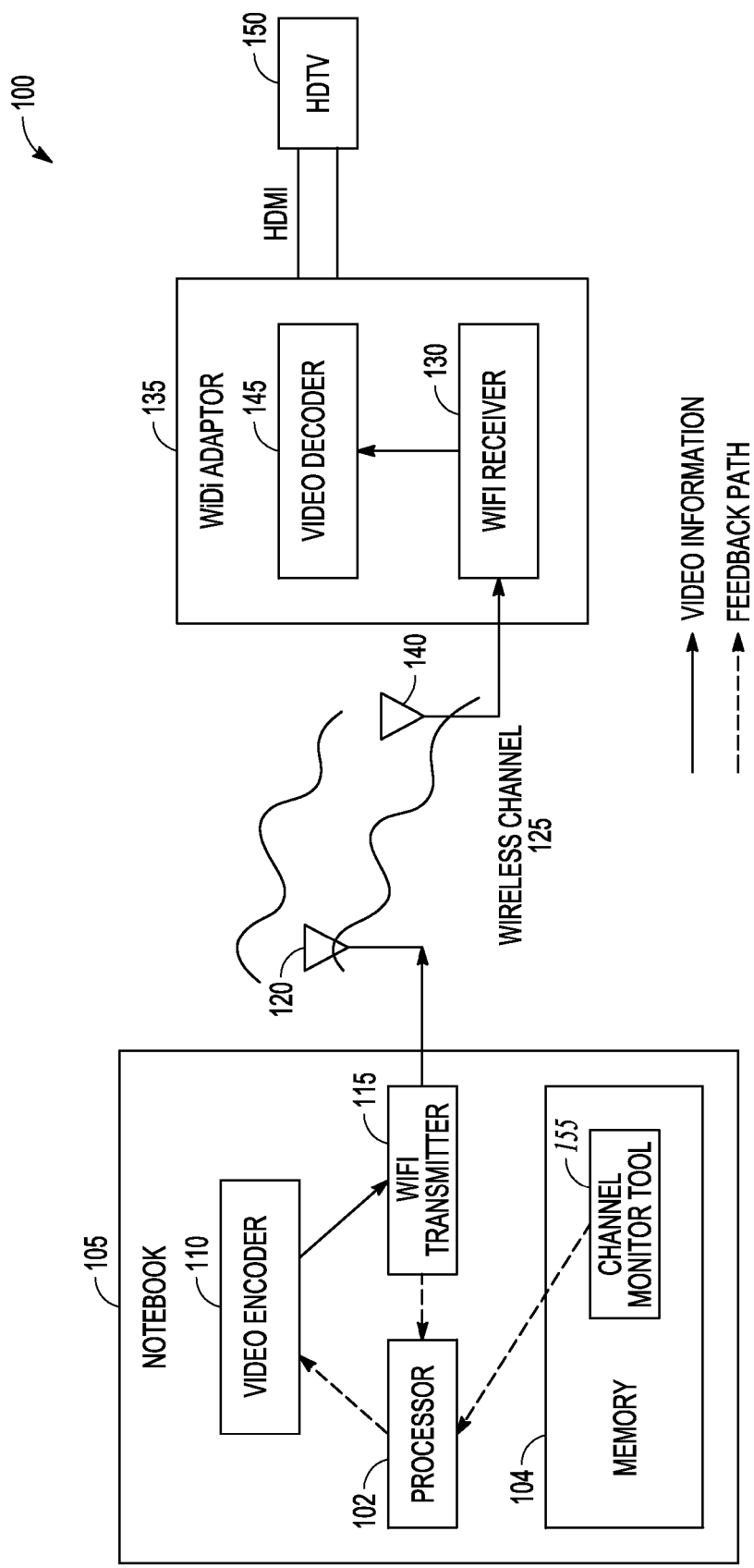
FIG. 1 illustrates a system embodiment in block diagram format.

The following description and the drawings sufficiently illustrate specific Embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims. Embodiments may be referred to herein, individually or collectively, by the term "invention" merely for convenience and without intending to limit the scope of this application to any single invention or inventive concept if more than one is in fact disclosed.

WLAN protocols and devices enable mobility and flexibility in computing systems, where devices and components may be implemented using wireless technology. For example, a PC may include a wireless processing unit, a wireless keyboard, a wireless mouse, and a wireless display. The PC then sends wireless signals to a display or other unit which contains a wireless adaptor for receiving wireless signal, thus reducing the wired connections of a system. A system using for example WLAN 802.11a/b/g/n protocol signaling enables hundreds of Megabits wireless applications over LAN using OFDM technology. Since the 802.11b/g/n protocol may use the 2.4 GHz license free band, those wireless devices may occasionally suffer interference from microwave ovens, cordless telephones and Bluetooth devices. Network resources may also be shared with other 802.11b/g/n wireless devices and applications and may therefore causes co-channel and adjacent channel interference. The quality of the received wireless signal is strongly dependent on the channel condition, which is in turn dependent on the sharing of channel resources with other wireless devices and applications. We have found that optimizing the amount of data transmitted using the wireless communication channels is critical for the successful video/audio transmission. For example, existing wireless display systems implement static video encoding, typically with an average bit rate of about 8 Mbps with video content, regardless of the channel condition. Should the channel condition worsen as a result of surrounding interference or noise, the quality of the video will deteriorate for example as a result of increasing packet loss or lengthy packet retransmission.

Embodiments propose an adaptive and efficient solution to control a data transmission rate of a wireless transmission device based on the current data transmission rate capacity of the wireless channel. Embodiments may use the 802.11 WLAN protocol including 802.11a/b/g/n and 802.11AC with OFDM technology at either a 2.4 GHz or 5 GHz band or 802.11AD at a 60 GHz band, or the 802.11AD WPAN protocol including for example UWB or BT, etc as would be recognized by one skilled in the art. Embodiments are particularly suited to the transmission of video data in wireless display systems. It is noted that, by "video," what is meant in the context of embodiments is a sequence of still images depicting not only scenes in motion but also still scenes. Audio information may also be included.

Referring to FIG. 1, a system is shown according to one embodiment. The system 100 may for example include a device 105, such as a PC or notebook, which may include a processor 102 and a memory 104 as shown. The device 105 may use a video encoder 110 to compress video data/a video signal. The device 105 may further include a Transmitter 115 which may transmit the compressed video data via an antenna 120 through an interface protocol by way of a wireless channel 125. The interface protocol may include a LAN 802.11 a/b/g/n, 802.11 AC and 802.11AD protocol, or a PAN protocol such as, for example, UWB, BT. The compressed video signal may be received by a WiFi receiver 130 what is part of a WiDi (wireless display) Adaptor 135 by way of an antenna 140. The WiFi receiver 130 may send the received compressed video data to a video decoder 145 for video decompression, after which the decompressed video data may be sent to a display device such as HDTV 150 using an interface protocol such as High-Definition Multimedia Interface (HDMI). Other interface protocols may include, by way of example, Mobile Industry Processor Interface (MIPI) Display Serial Interface (DSI), regardless of the content of the display data. Thus, both device 105 and adaptor 135 may support wireless communications. Although not shown, embodiments also encompass integrating the wireless adaptor into the TV to save an HDMI wired connection, or to have a wireless connection between the adaptor and the TV. As further seen in FIG. 1, memory 104 may store processing instructions in the form of a channel monitor tool (CMT) 155, which may be configured to direct the processor to determine a current data transmission rate capacity of wireless channel 125 (C bps). CMT 155 is further configured to direct the processor to determine whether the current data transmission rate capacity of channel 125 (for example, an average video bit rate of A bps) is less than a current data transmission rate through channel 125 (C bps). If so, the CMT 155 is then configured to direct the processor to control a data transmission rate of transmitter 115, for example by directing encoder 110 to encode the next set of data at a corrected data transmission rate (B bps) that is lower than or equal to the current data transmission rate capacity of channel 125 (C bps with B≦C). For example, B may be selected to be lower than C. In addition, if the current data transmission rate capacity of channel 125 is higher than a current data transmission rate through channel 125 (C bps), CMT 155 may also direct the processor to control a data transmission rate of transmitter 115 for example by directing encoder 110 to encode the next set of data at a corrected transmission rate (N bps) that is higher than the current data transmission rate (A bps) but still lower than the current data transmission rate capacity of channel 125. For example, according to a preferred embodiment, B or N as the case may be may be set to represent between about 50% and about 70% of the current data transmission rate capacity of the channel. According to the shown embodiment of FIG. 1, when WiDi is running, the Transmitter 115 may send information regarding video data, such as packet information (i.e. physical data rate, number of passing packets, number of failing packets, etc) to processor 102. Using the CMT, the processor may estimate the instantaneous channel capacity, that is, the current data transmission rate capacity of the channel using the information regarding video data sent from the transmitter 115. The CMT may therefore run simultaneously with other wireless display applications of the wireless display systems. In order to determine the current data transmission rate capacity, the CMT may for example take into consideration channel utilization data from other radios present within a range of the wireless channel. For example, the CMT may use the following equation to determine the current data transmission range capacity of the channel:

$$WiDiChanCap = \frac{\sum_{i=min(MCSRate)}^{i=max(MCSRate)} NumPacket(i) * \frac{(1-PER(i))}{\sum_{i=min(MCSRate)}^{i=max(MCSRate)} NumPacket(i) * \frac{1}{XXXTpt(i)}}} \left(1 - \frac{Channel\ busy}{Totaltime}\right) \quad (Eq.\ 1)$$

where:
  WiDiChanCapacity is the current data transmission rate capacity of the channel;
  i is the physical data rate;
  MCSRate is the modulation and coding rate representing the physical layer link speed based on the protocol being used;

PER is the packet error rate per each physical data rate, that is, the ratio of number of failed packets on the one hand and number of total transmitted packets on the other hand;
  NumPacket is the number of packet transmitted with each rate;
  XXXTpt is a maximum throughput of the channel based on a "XXX" protocol; the XXX protocol could include any suitable protocol such as, for example, UDP, TCP or RTP, for example with a video contention window of 7 (min) and 15 (max), coordinated with a medium access layer or MAC layer;
  channelbusy is the time that the wireless channel is occupied by other co-existing radio interference since the wireless channel may be shared; and
  Totaltime is the time set aside to check the channel busy time.

According to some embodiments, the CMT may be configured to allow the processor to determine the current data transmission rate capacity of the channel within a predetermined time interval, such as 100 ms, 500 ms, 1 second or any other interval programmed as part of the CMT code. A minimum loop rate for determining the current data transmission rate capacity of the channel may for example depend on the amount of time it would take for any change in bit-rate to take effect within the channel from the time a data transmission rate capacity in the channel is detected until a change in transmission rate actually takes effect. For example, if it takes one second for a change in bit-rate to take effect within the channel from the time that a change in the current data transmission rate capacity is detected, it would make sense to set the loop rate for determining the current data transmission rate capacity of the channel at 1 second or more. For example, keeping in mind that the video may be encoded with a group of pictures (GOP), the current data transmission rate capacity of the channel could change sometime during the transmission of a first GOP. However, the encoder could start getting ready to change the data transmission rate at the beginning of next GOP, and the change may then take effect only at the end of that next GOP. A maximum amount of time between detection of a change in current data transmission rate capacity and a change in transmission rate actually taking effect may therefore be close to two GOP durations. It would therefore be preferable to set the loop rate for determining the current data transmission rate capacity of the channel at a time interval close to this maximum amount of time or longer, although other loop rates are within the purview of embodiments.

According to one implemented example, an IPERF, which is a commonly used network testing tool written in C++ language that can create TCP and UDP data streams and measure the throughput of a network that is carrying them, was used to generate and send UDP traffic to simulate different video data transmission rates (starting from 5 Mbps, and going up to 15 Mbps, 20 Mbps, and 25 Mbps at 60 second intervals. IPERF was also used to calculate throughput over the channel while a CMT tool was running simultaneously in order to indicate current channel conditions. The average channel throughput calculated by the CMT was found to match the IPERF results.

Using a CMT, such as, for example, a CMT as described, would allow the encoding/compression of video data adaptively according to wireless channel conditions. Thus, if the wireless channel can support a high data transmission rate, the encoder may encode the video data at a high resolution. On the other hand, advantageously, if the channel is noisy and can support only a lower data rate, the encoder may encode the video data at a lower resolution. Using a lower data rate ensures that no or fewer data packets are lost and that the video quality is maintained at a user acceptable level. In addition, such adaptive coding schemes contribute to reduce network jitter and lower buffer delay. As previously noted, the above solution is compatible for example with the 802.11 WLAN protocol including 802.11a/b/g/n and 802.11AC with OFDM technology at either a 2.4 GHz or 5 GHz band or 802.11AD at a 60 GHz band, or the 802.11AD WPAN protocol including for example UWB or BT, etc as would be recognized by one skilled in the art, other protocols however being within the purview of embodiments. Embodiments may be particularly suited to the transmission of video data in wireless display systems.

Thus, although exemplary embodiments have been described for the most part with respect to video encoding for use in wireless display systems, embodiments are not so limited, and may broadly involve an adaptive control of the wireless transmission rate of any wireless signal based on a current data transmission rate capacity of a wireless channel to transmit the signal.

In some embodiments, transmitter 115 may be configured to transmit Orthogonal Frequency-Division Multiplex (OFDM) communication signals over a multicarrier communication channel. The OFDM signals may comprise a plurality of orthogonal subcarriers. In some of these multicarrier embodiments, transmitter 115 may be part of a Wireless Local Area Networks (WLANs) communication station such as a Wireless Access Point (WAP), base station or a mobile device including a Wireless-Fidelity (Wi-Fi) device. In some other embodiments, transmitter 115 may be configured to transmit signals that were transmitted using one or more other modulation techniques such as spread spectrum modulation (e.g., Direct Sequence Code Division-Multiple Access (DS-CDMA) and/or Frequency Hopping Code Division-Multiple Access (FH-CDMA)), Time Division-Multiplexing (TDM) modulation, and/or Frequency Division-Multiplexing (FDM) modulation, although the scope of the embodiments is not limited in this respect.

In some embodiments, device 105 may include a portable wireless communication device, such as a Personal Digital Assistant (PDA), a laptop or portable computer with wireless communication capability, a web tablet, a wireless telephone, an instant messaging device, a digital camera, an access point, a television, a medical device (e.g., a heart rate monitor, a blood pressure monitor, etc.), or other device that may receive and/or transmit information wirelessly.

Antennas 120 and 140 may comprise one or more directional or omni-directional antennas, including, for example, dipole antennas, monopole antennas, patch antennas, loop antennas, micro-strip antennas or other types of antennas suitable for transmission of RF signals.

Embodiments may be implemented in one or a combination of hardware, firmware, and software. Embodiments may also be implemented as instructions stored on a machine-readable medium, which may be read and executed by at least one processor to perform the operations described herein. A machine-readable medium may include any mechanism for storing or transmitting information in a form readable by a machine (e.g., a computer). A machine-readable medium may include, but is not limited to, FLASH memory, optical disks, Compact Disks-Read Only Memory (CD-ROM), Digital Versatile/Video Disks (DVD), Read Only Memory (ROM), Random Access Memory (RAM), Erasable Programmable Read-Only Memory (EPROM), Electrically Erasable Programmable Read-Only Memory (EEPROM), magnetic or optical cards, propagation media or other type of machine-readable media suitable for storing electronic instructions. For example, embodiments may be downloaded as a computer program which may be transferred from a remote computer (e.g., a server) to a requesting computer (e.g., a client) by way of data signals embodied in a carrier wave or other propagation medium via a communication link (e.g., a modem or network connection).

Figure 2:
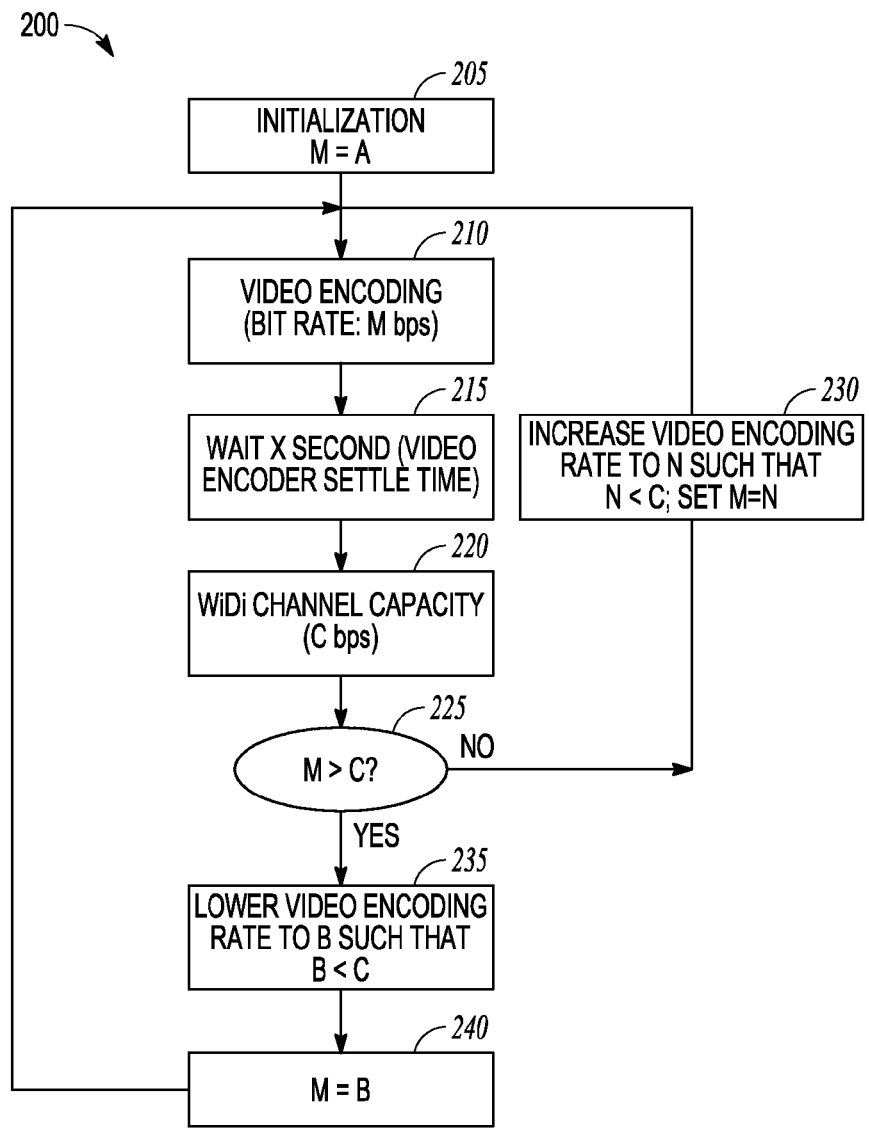
FIG. 2 illustrates, in flow diagram format, a method to adaptively control video data transmission rate in a wireless display system according to one embodiment.

Referring next to FIG. 2, a method embodiment is shown in block diagram format. The method to adaptively control data transmission rate is illustrated at method 200, which involves initialization the encoding bit-rate M bps to be equal to an initial bit-rate of A bps at 205. The method may further include encoding video data at an encoding bit-rate of M bps 210. At the beginning of video data transmission, M will be equal to A as set by the initialization 205. Initialization may for example be effected by an encoder such as encoder 110 of FIG. 1. According to one embodiment, the encoder may be configured to set the initialization bit-rate M at a value that is less than a typical value associated with encoder initialization, which is currently set at about 8 Mbps. Thus, by way of example, the initialization bit-rate could be set to equal about 2 Mbps. Setting the initialization bit-rate at a lower value may enhance the adaptiveness of a system and method according to embodiments by allowing a robust mechanism to adaptively and seamlessly increase the data transmission rate below a maximum threshold value (such as, for example, a bit-rate value that is about 50% to about 70% of the current data transmission rate capacity of the channel) without affecting user experience. At block 215, the encoder may undergo a settle time or wait period for a predetermined amount of time x, for example, the settle time allowing the bit-rate set by the encoder to actually take effect within the channel. Thereafter, at block 220, the WiDi channel capacity, that is, the current data transmission rate capability C bps of the channel may be determined. For example, a CMT may be used to determine the current data transmission rate capability of the channel. Then, at block 225, a determination is made as to whether the current data transmission rate or encoding rate M is higher than or equal to the channel capacity C. If yes, then, at block 235, the video encoding rate may be lowered to a value of B bps which is less than C. Then, at block 240, the encoding rate is set to B bps and the setting of the encoding rate is used to encode video at block 210. However, if at block 225 M is determined to be less than C, then, at block 230, the video encoding rate is increased to N bps such that N is less than C, and M is set to equal N. Thereafter, at block 210, the setting of the encoding rate is used to encode video. Alternative embodiments may involve for example not including block 230, or not lowering the video encoding rate at block 235 if M is determined to be equal to C. Other alternatives are within the purview of embodiments.

Figure 3:
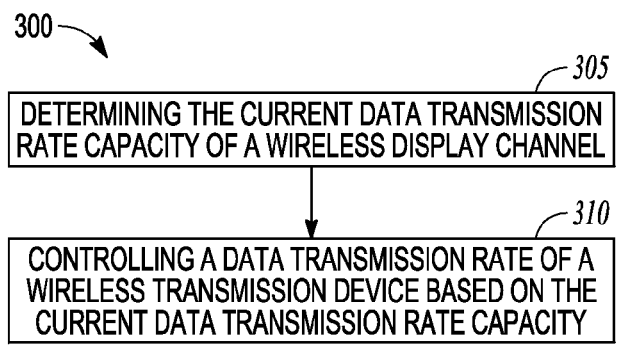
FIG. 3 illustrates, in flow diagram format, a method to adaptively control wireless data transmission rates according to another embodiment.

Referring next to FIG. 3, an alternative method embodiment 300 may involve, at block 305, determining a current data transmission rate capacity of a wireless channel, and at block 310, controlling a data transmission rate of a wireless transmission device based on the current data transmission rate capacity of the wireless channel. Examples for an implementation of this method embodiments are provided with respect to FIGS. 1 and 2 described in detail above.

Having disclosed embodiments and the best mode, modifications and variations may be made to the disclosed embodiments while remaining within the scope of the embodiments as defined by the following claims.

What is claimed is:
1. A method performed to control a transmit rate of a wireless display device, the method comprising:
  determining a current data transmission rate capacity of a wireless channel;

controlling a data transmission rate of a wireless transmission device based on the current data transmission rate capacity, and wherein determining the current data transmission rate capacity comprises estimating the current data transmission rate capacity using the following equation:

$$WiDiChanCap = \frac{\sum_{i=min(MCSRate)}^{i=max(MCSRate)} NumPacket(i) * (1 - PER(i))}{\sum_{i=min(MCSRate)}^{i=max(MCSRate)} NumPacket(i) * \frac{1}{XXXTpt(i)}} \left(1 - \frac{\text{Channel busy}}{\text{Totaltime}}\right).$$

where:
- WiDiChanCapacity is a current data transmission rate capacity of the channel;
- i is a physical data rate;
- MCSRate is a modulation and coding rate representing a physical layer link speed based on a protocol being used;
- PER is a packet error rate per each physical data rate, that is, a ratio of number of failed packets and number of total transmitted packets;
- NumPacket is a number of packets transmitted with each rate;
- XXXTpt is a maximum throughput of the channel based on a "XXX" protocol;
- channelbusy is a time that the channel is occupied by any other co-existing radio interference; and
- Totaltime is a time set aside to check a channel busy time.

2. The method of claim 1, wherein the data comprises video data, the current data transmission rate comprises current video data transmission rate, and the current data transmission rate capacity comprises current video data transmission rate capacity.

3. The method of claim 1, wherein controlling comprises: determining a current data transmission rate of the wireless transmission device; encoding data to be transmitted by the transmission device on the wireless chamael with a corrected data transmission rate that is lower than the data transmission rate capacity of the wireless channel if the current data transmission rate capacity—is determined to be lower than the current data. transmission rate.

4. The method of claim 1, wherein determining the current data transmission rate capacity comprises estimating the current transmission rate capacity using channel utilization data from other radios present within a range of the wireless channel.

5. The method of claim 1, wherein determining the current data transmission rate capacity comprises determining the current data transmission rate within a predetermined time interval.

6. The method of claim 1, wherein the wireless communications support a WLAN or a WPAN communication protocol.

7. A non-transitory computer readable storage medium encoded with computer executable instructions, which, when accessed, cause a machine to perform operations comprising: determining a current data transmission rate capacity of a wireless display channel; controlling a data transmission rate of a wireless transmission device based on the current data transmission rate capacity, wherein determining the current data transmission rate capacity comprises estimating the current data transmission rate capacity using the following equation:

$$WiDiChanCap = \frac{\sum_{i=min(MCSRate)}^{i=max(MCSRate)} NumPacket(i) * (1 - PER(i))}{\sum_{i=min(MCSRate)}^{i=max(MCSRate)} NumPacket(i) * \frac{1}{XXXTpt(i)}} \left(1 - \frac{\text{Channel busy}}{\text{Totaltime}}\right)$$

where:
- WiDiChanCapacity is a current data transmission rate capacity of the channel;
- i is a physical data rate;
- MCSRate is a modulation and coding rate representing a physical layer link speed based on a protocol being used;
- PER is a packet error rate per each physical data rate, that is, a ratio of number of failed packets and number of total transmitted packets;
- NumPacket is a number of packets transmitted with each rate;
- XXXTpt is a maximum throughput of the channel based on a "XXX" protocol;
- channelbusy is a time that the channel is occupied by any other co-existing radio interference; and
- Totaltime is a time set aside to check a channel busy time.

8. The non-transitory computer readable storage medium of claim 7, wherein the data comprises video data, the current data transmission rate comprises current video data transmission rate, and the current data transmission rate capacity comprises current video data transmission rate capacity.

9. The non-transitory computer readable storage medium of claim 7, wherein controlling comprises:
determining a current data transmission rate of the wireless transmission device;
encoding data to be transmitted by the transmission device on the wireless channel with a corrected data transmission rate that is lower than the data transmission rate capacity of the wireless channel if the current data transmission rate capacity is determined to be lower than the current data transmission rate.

10. The non-transitory computer readable storage medium of claim 7, wherein determining the current data transmission rate capacity comprises estimating the current transmission rate capacity using channel utilization data from other radios present within a range of the wireless channel.

11. The non-transitory computer readable storage medium of claim 7, wherein determining the current data transmission rate capacity comprises determining the current data transmission rate within a predetermined time interval.

12. The non-transitory computer readable storage medium of claim 7, wherein the wireless communications support a WLAN or WPAN communication protocol.

13. An apparatus comprising:
a wireless communications device having a processor and a memory, the device including:
an encoder to compress a video signal based on a data transmission rate capacity of a wireless channel for the signal, the encoder to thereby generate a compressed signal; and
a transmitter to wirelessly transmit the compressed signal;

wherein the device is to determine the current data transmission rate capacity by estimating the current by estimating the current data transmission rate capacity using the following equation:

$$WiDiChanCap = \frac{\sum_{i=min(MCSRate)}^{i=max(MCSRate)} NumPacket(i) * (1-PER(i))}{\sum_{i=min(MCSRate)}^{i=max(MCSRate)} NumPacket(i) * \frac{1}{XXXTpt(i)}} \left(1 - \frac{\text{Channel busy}}{Totaltime}\right)$$

where:

WiDiChanCapacity is a current data transmission rate capacity of the channel;

i is a physical data rate;

MCSRate is a modulation and coding rate representing a physical layer link speed based on a protocol being used;

PER is a packet error rate per each physical data rate, that is, a ratio of number of failed packets and number of total transmitted packets;

NumPacket is a number of packets transmitted with each rate;

XXTpt is a maximum throughput of the channel based on a "XXX" protocol;

channelbusy is a time that the channel is occupied by any other co-existing radio interference; and Totaltime is a time set aside to check a channel busy time.

14. The apparatus of claim 13, wherein the encoder is a video encoder, the data transmission rate capacity is a video data transmission rate capacity.

15. The apparatus of claim 14, wherein the device is to control a wireless transmission rate of the compressed video signal by:

determining a current data transmission rate of the wireless transmission device;

controlling the video encoder to encode data to be transmitted by the transmission device on the wireless channel with a corrected data transmission rate that is lower than the data transmission rate capacity of the wireless channel if the current data transmission rate capacity is determined to be lower than the current data transmission rate.

16. The apparatus of claim 13, wherein the device is to determine the current data transmission rate capacity by determining the current data transmission rate within a predetermined time interval.

17. The apparatus of claim 13, wherein the wireless communications support a WLAN or a WPAN communication protocol.

* * * * *

UNITED STATES PATENT AND TRADEMARK OFFICE
CERTIFICATE OF CORRECTION

PATENT NO. : 8,520,728 B2  Page 1 of 1
APPLICATION NO. : 12/924231
DATED : August 27, 2013
INVENTOR(S) : Gao et al.

It is certified that error appears in the above-identified patent and that said Letters Patent is hereby corrected as shown below:

In the Claims

In column 7, line 33, in Claim 1, delete "channelbusy" and insert --Channel busy--, therefor In column 7, line 44, in Claim 3, delete "chamael" and insert --channel--, therefor In column 7, line 47, in Claim 3, delete "capacity-is" and insert --capacity is--, therefor In column 7, line 48, in Claim 3, delete "data." and insert --data--, therefor In column 8, line 30, in Claim 7, delete "channelbusy" and insert --Channel busy--, therefor In column 10, line 1, in Claim 13, delete "XXTpt" and insert --XXXTpt--, therefor In column 10, line 3, in Claim 13, delete "channelbusy" and insert --Channel busy--, therefor Signed and Sealed this
Fifth Day of November, 2013

Teresa Stanek Rea
*Deputy Director of the United States Patent and Trademark Office*